United States Patent [19]

Krag et al.

[11] 3,792,527

[45] Feb. 19, 1974

[54] APPARATUS AND METHOD FOR STRINGING MAGNETIC CORES

[75] Inventors: Niels Krag, Pacific Palisades; Ernest S. Hernandez, Hawthorne; Kalman Horvath, Lawndale, all of Calif.

[73] Assignee: Electronic Memories and Magnetics Corporation, Los Angeles, Calif.

[22] Filed: Apr. 19, 1972

[21] Appl. No.: 245,542

[52] U.S. Cl. .............................. 29/604, 29/203 MM
[51] Int. Cl. .......................... H01f 7/06, H05k 13/04
[58] Field of Search.. 29/203 MM, 203 P, 241, 433, 29/604

[56] References Cited

UNITED STATES PATENTS

| | | | |
|---|---|---|---|
| 3,314,131 | 4/1967 | Judge | 29/241 X |
| 3,375,564 | 4/1968 | Walstrom | 29/203 MM |
| 3,665,596 | 5/1972 | Ford | 29/604 |

*Primary Examiner*—Thomas H. Eager
*Attorney, Agent, or Firm*—Lindenberg, Freilich & Wasserman

[57] ABSTRACT

A matrix of magnetic cores is strung with electric wires by first laying the wires along with needles attached to their front ends on adhesive tape. The tape is pulled to advance the needles and wires towards the matrix, but the tape passes over an edge so that it separates from the needles and the needles then pass through rows of magnetic cores of the matrix.

16 Claims, 14 Drawing Figures

APPARATUS AND METHOD FOR STRINGING MAGNETIC CORES

BACKGROUND OF THE INVENTION

This invention relates to apparatus and methods used in the production of magnetic core memories and the like.

Magnetic core memories include large numbers of magnetic cores held on a support, and large numbers of wires that extend through the cores. For example, a large number of toroidal cores may be arranged in columns and rows on a support, and two or more sets of wires may be strung through the cores. Each wire of a first set may project through all cores of a single row while each wire of a second set may project through all cores of a single column, so that there are two wires projecting through the hole of each core. Each matrix of cores may contain many thousands of very samll cores, and hundreds of wires may have to be strung through the many columns and rows of cores.

One method which can be used to string wires through the cores is to attach a needle to the front end of a wire and to push the needle through a row of cores and then pull the wire through. A worker can, if necessary, view the matrix of cores through a microscope and can hold the needle with a tweezers to project it through a row of cores. Because of the large numbers of wires that must be strung, considerable time is spent in projecting all of the wires through a large matrix. If a relatively simple apparatus and method were available for enabling more rapid stringing of cores, the cost of the magnetic core memories could be reduced substantially.

SUMMARY OF THE INVENTION

In accordance with one embodiment of the present invention, an apparatus and method for stringing magnetic cores is provided which enables the projection of large numbers of wires at the same time through a matrix of cores, to greatly reduce the cost of stringing. The electric wires with needles of sufficient length are attached to their front ends, are layed on a length of adhesive tape so that the needles and wires extend parallel to one another and are spaced at distances corresponding with the core row spacing from one another along the width of the tape. The front ends of the needles are initially held at their proper spacing by the tape, but as part of the process are later inserted into a cassette or guide member which contain grooves that match the needle and core spacings. The tape and guide member are positioned in front of a matrix of magnetic cores that are to be strung, and the front end of the tape is passed around a separating edge and attached to a roller. As the roller is slowly turned, the tape pulls the rear portions of the needles in a direction towards the guide member and matrix of cores, but the tape continually separates from the needles so that only the needles pass through the guide member. An operator viewing the matrix through a microscope, makes sure that each of the numerous needles begins passing through the holes of the cores. Once the needles have passed through the matrix of cores, and beyond a receiving cassette or guide member, the needles which now protrude from the receiving cassette or guide member are temporarily anchored there. The tape is removed from the remaining rear portions of the needles and all but the rear ends of the wires. The guide member is then moved away from the cores to pull the wires through the cores. During the pulling of the needles after they have passed through the cores, a new length of tape is layed onto the needles and the wires emerging from the matrix of cores, so that a new assembly which includes needles and wires spaced at known intervals and held on the tape, is provided for use in another stringing operation. This permits economical use of the needles through several passes.

In those cases where the matrix has already been strung with wires extending in a first direction and it is necessary to string the next set of wires substantially perpendicular but not necessarily exactly perpendicular) to the first set, it is desirable to locate all of the first wires at the extreme bottom of the core holes. This is accomplished by holding the previously strung matrix in a curve matrix holder or vise and pulling the first set of wires taut so they lie at the bottoms of the core holes. This facilitates stringing the second set of wires, even if the second set is to be strung one at a time instead of as a group. The second set of wires can be strung together in a manner similar to the first set, except that a curved guide is utilized so that the passage in the guide direct each of the needles through a row of cores even though all of the rows are not in the same plane.

The novel features of the invention are set forth with particularity in the appended claims. The invention will best be understood from the following description when read in conjunction with the accompanying drawings.

DESCRIPTION OF THE PREFERRED EMBODIMENTS

Figure 2:
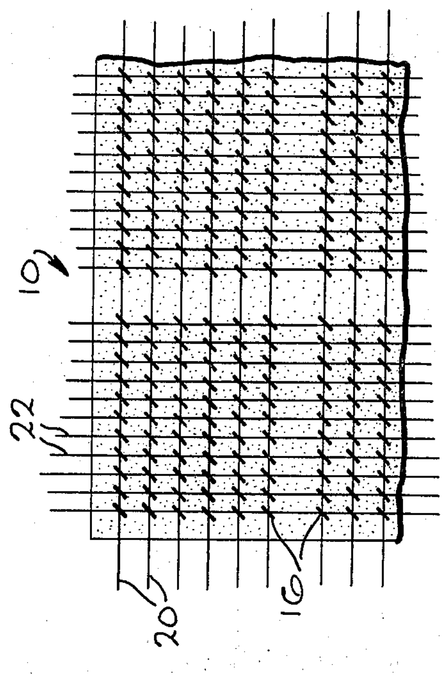
FIG. 2 is a top view of the strung core matrix of FIG. 1.
Figure 1:
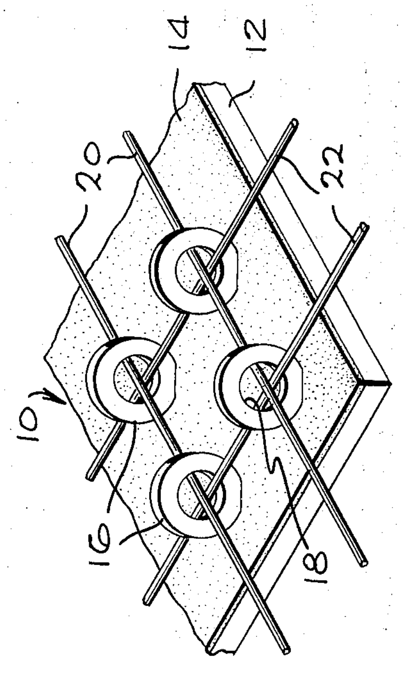
FIG. 1 is a perspective view of a portion of magnetic core matrix which has been strung with electrical conductors in two directions.

FIGS. 1 and 2 illustrate a typical matrix of magnetic cores which have been strung by the apparatus and method of the invention. The matrix 10 includes a support board or substrate 12, a layer of embedding material 14 on the substrate, and a large number of magnetic cores 16 embedded in the layer 14. Magnetic cores are produced in a wide variety of shapes, the particular cores illustrated herein being of the toroidal type which have central holes 18. Two sets of electrical wires extend through the cores, one set of wires 20 extending perpendicular to the other set 22. The cores 16 are arranged in rows and columns, each wire 20 of the first set extending through all cores of a row, while each wire 22 of the second set extends through all cores of a column. A matrix may include a large number of cores, such as 128 columns and 128 rows, so that 128 wires may have to be strung in each direction through the cores. The cores are often very small, and considerable labor has heretofore been required to string all of the many wires.

Figure 3:
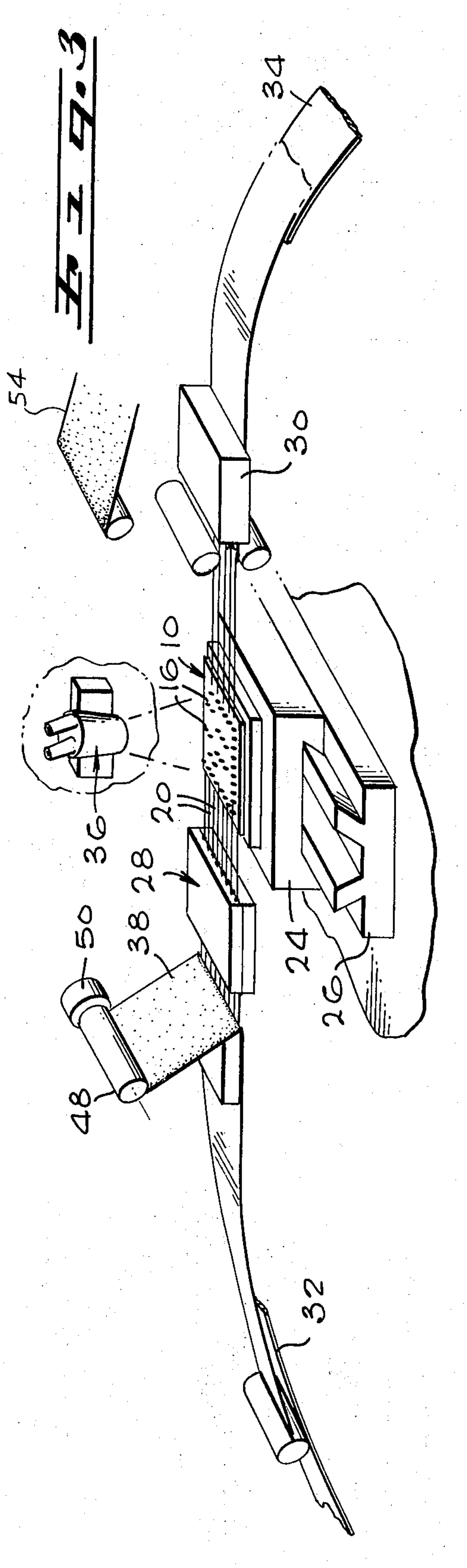
FIG. 3 is a perspective view of the core stringing apparatus of the invention.
Figures 5, 6:
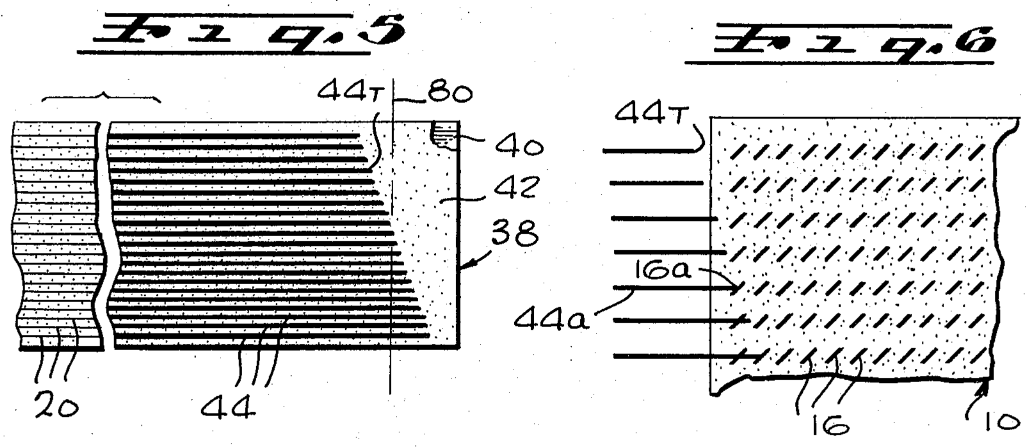
FIG. 5 is a partial bottom view of the tape, needle, and wire assembly of the apparatus of FIG. 3, shown prior to installment on the apparatus of FIG. 3.
FIG. 6 is a top view of the apparatus of FIG. 3, showing how the needles are inserted into the cores of the matrix.

FIG. 3 illustrates core stringing apparatus of the invention which can be used to string a large number of wires 20 at the same time through the core matrix 10, to greatly reduce the required labor. The apparatus includes a vise 24 mounted on a lathe bed 26, an entrance guide 28 and exit guide 30 mounted at opposite ends of the matrix 10, and a pair of tracks 32, 34 leading to the entrance guide 28 and away from the exit guide 30. A microscope 36 is provided for viewing the matrix 10 during the stringing process. As also shown in FIG. 5, the wires 20 are mounted on a length of adhesive tape 38, which includes a strip 40 of flexible material and an adhesive 42 in which the wires 20 are held. The front ends of the wires 20 are attached to the rear ends of long needles 44, to facilitate projection of the wires through the magnetic cores. Each wire 20 and the needle 44 attached to it, form a needle-wire assembly, and each of these assemblies extends parallel to the others along the length of the tape 38. Generally, the rows of cores of the matrix are uniformly spaced from one another (although there may be a larger spacing between different groups of cores) and the needle-wire assemblies are correspondingly spaced from one another along the width of the tape.

Figure 4:
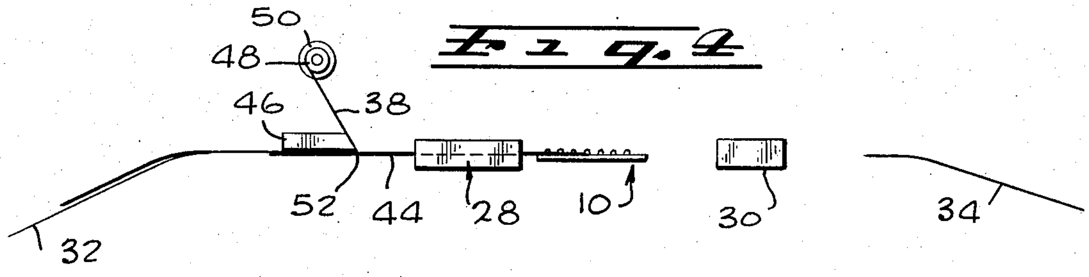
FIG. 4 is a partial side elevation view of the core stringing apparatus of FIG. 3.

In the stringing process, the tape 38 with the needle-wire assemblies thereon is mounted to extend along the track 32 and under a separation member 46, as shown in FIG. 4. The front portion of the tape 38 is separated from the needle 44 and is attached to a roller 48. As a knob 50 on the roller is slowly turned, the tape is pulled and it advances the needles 44 through the entrance guide 28 and towards the core matrix 10. However, at a separating edge 52 of the separating member 46, the tape separates from the needle 44, with the tape moving towards the roller 48 while the needle 44 continues to move toward the core matrix 10.

As the forward tips of the needles 44 reach the rows of cores of the matrix 10, the operator may shift the position of the matrix vise 24 along the lathe bed 26 to make sure that the needles pass through holes of the cores. The vise 24 may be constructed to enable rotation as well as lateral and vertical shifting of the matrix. As the tape take-up roller 48 continues to turn, the needles 44 pass completely through the rows of cores of the matrix 10, pass through the exit or receiver guide member 30, and reach a position wherein the needle tips all project out of the exit guide 30.

After the needles 44 project out of the exit guide 44, they can be pulled by anchoring the needles to the exit guide and moving it down the track 34. Prior to pulling the forward ends of the needles 44 after they emerge from the exit guide 30, and are anchored thereto, the tape 38 is peeled away from the rear ends of the needles 44 and from all but the rear ends of the wires 20. This eliminates bending of the relatively soft electrical wires if they tend to move with the tape around the separation edge 52. The front ends of the needles are then pulled to advance the wires through the core matrix by moving the exit guide 30 along the track 34. Finally when the rear portions of the wires reach the matrix, the wires can be cut so that there is only a moderate length of wire projecting through each row of cores.

In order to facilitate handling of the needle-wire assemblies when they are used in another stringing operation, another length of tape 54 is provided which can be applied to the needles 44 and to the forward portions of the wires 20 as they emerge from the exit guide 30. After all but the rear ends of the wires 20 have been pulled through the matrix, the rear portions of the wires are cut. The forward portions of the wires and their needles are held on the new length of tape 54 at the proper lateral spacing from another corresponding to the core row spacing so that they can be readily used in another stringing operation.

Figure 7:
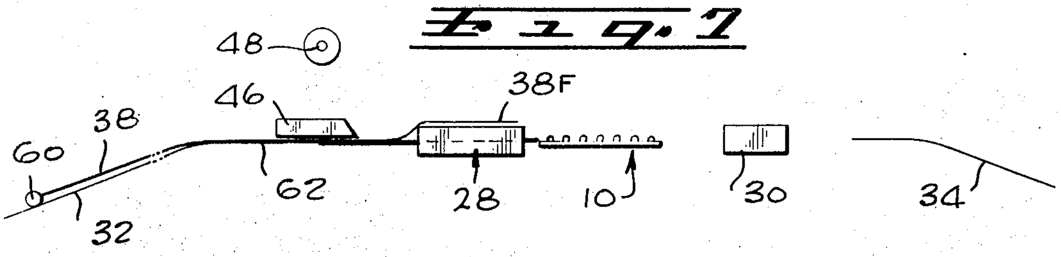
FIG. 7 is a simplified side elevation view of the apparatus of FIG. 3, shown during initial set-up.

FIGS. 7-10 illustrate some of the major steps involved in the stringing operation. FIG. 7 illustrates the apparatus partially set up for stringing, with a pulling roller 60 attached to the rear end of the tape 38. The pulling roller 60 tends to move down along the inclined track 32, so that it holds the tape taut. The tape with the wires and needles thereon extends along the inclined portion of the track 32 and along a horizontal surface 62 to the entrance guide 28. The front ends of the needles project through passageways in the guide 28 while the front end 38F of the tape initially lies on top of the guide. The separating member 46 is layed over the tape and the front end 38F of the tape is removed from the top of the guide and attached to the take-up roller 48.

Figure 8:
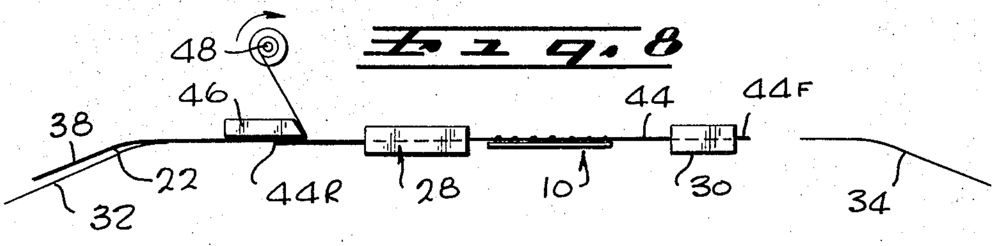
FIG. 8 is a view of the apparatus of FIG. 7, shown after projection of the front needle portions through the matrix.

As shown in FIG. 8, the roller 48 is turned to move the needle 44 through the matrix 10 until the forward ends 44F of the needles have projected through the exit guide 30. The needles 44 are long enough so that their rear ends 44R have not yet reached the separation edge 52 when the forward ends 44F are projecting out of the exit guide 30. This is desirable because the wires may become bent as they tend to follow the tape over the separation edge 52. This does not happen to the needles 44, inasmuch as they are made of a stiff material such as steel rather softer material such as copper of which the wires 22 are constructed. The tape 38 is removed from the wires by removing the separation member 46 and then peeling back the tape 38 until all but the rear end of the tape has been peeled from the wires.

Figure 9:
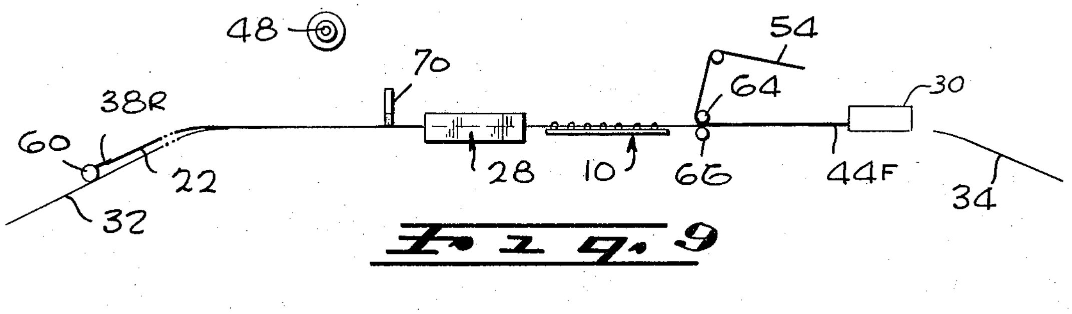
FIG. 9 is a view of the apparatus of FIG. 8, shown as the needles emerging from the core matrix are being retaped.

FIG. 9 illustrates the situation after the tape has been peeled back from all but the rear of the wires 22. A small length of tape 38R remains at the rear of the wires to prevent tangling and to still keep the wires attached to the pulling roller 60 so the wires remain taut.

Before the separating member 46 is removed and the tape subsequently is pulled back, the exit guide 30 is moved to the right, on the beginning portion of track 34. This provides a space between the matrix 10 and the receiving end of exit guide 30. The needle tips 44F are now anchored to the exit guide 30 and the new tape 54 can be properly placed on the needles. The front end of the new tape 54 is extended around a pressure roller 64 and onto the needle portions that are now exposed between the matrix 10 and the exit guide 30. The pressure roller 64 is pressed down against a backup roller 66 so that the second tape 54 is pressed firmly against the needles. The exit guide 30 is moved along track 34, pulling the wires through the matrix 10. The wires are kept reasonably taut by roller 60 being on inclined track 32. Through the motion of exit guide 30, tape 54 is laid onto wires 22 as they emerge from matrix 10. In order to prevent wire entanglement at the entry to guide 28 a brake 70 is applied to the wires 22. Although roller 60 maintains general tautness, slight differences in tautness are corrected by brake 70. The brake 70 includes a flat surface with felt or other facing pressed lightly against the wires 22 to apply a low amount of friction to all of the wires, to thereby maintain equal tautness just prior to the wire entering into guide member 28.

Figure 10:
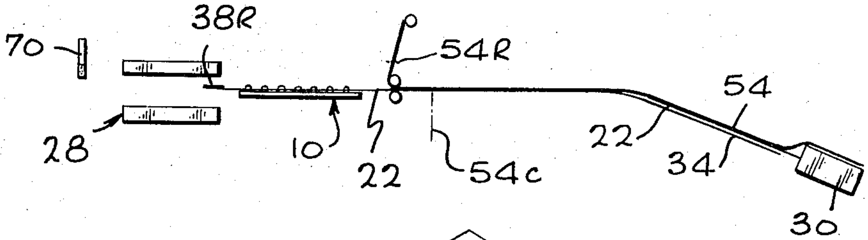
FIG. 10 is a view of the apparatus of FIG. 9 shown with the wires fully drawn through the core matrix.

FIG. 10 illustrates the final portion of the process. The tape has been released from roller 60 and the brake 70 has been opened. The entrance guide 28 is opened to allow the end tape portion 38R to reach a position close to the core matrix 10. The new tape is cut at 54R and layed down against the wires 22 to a position near the core matrix 10. The new tape 54 and the wires 22 then may be cut again at the location 54C. This leaves a tape strip on the wires protruding from matrix 10 and to separate the wire portions extending through the core from the newly laid tape, wire and needle assembly. The new assembly now has the exit guide 30 anchored to it and is ready for another stringing operation by letting exit guide 30 take the position of entry guide 28 which now will take on the function of the exit guide.

The needle-wire assemblies may be formed by butt welding the forward ends of the insulated wires to the rearward ends of the needles. These needle-wire assemblies may then be applied to the tape by holding the tape taut, laying each needle at a closely controlled position on the tape, and pulling the wire taut while pressing it against the tape. In order to facilitate the stringing process, the needles are arranged in the manner shown in FIG. 5, with the extreme forward tips 44T of the needles spaced at different distances from an imaginary transverse line 80 that extends perpendicular to the length of the tape. This aids in the initial projection of the needle tips 44T as indicated in FIG. 6 which shows how the needle tips are initially projected into the cores 16. Because of the arrangement of the needle tips 44T, only one or a few of the tips will, at any one time, begin projecting through the cores of the matrix. Thus, in FIG. 6, only one of the needles 44a is in a position to begin projecting through one of the cores 16a for a given position of the needle arrangement. The other needles either have already begun projecting through the core or have not yet reached the cores. The projection of each needle tip through the first core or first few cores is a critical time in the stringing process. If the needle is not exactly in a position to enter the core hole, then the operator may shift the matrix a small amount laterally, vertically, or rotationally, in order to align the hole of a core with the needle which is about to enter it. After a needle has entered the first core or first few cores of a row, the first cores will guide the needle so that it thereafter tends to project through the rest of the cores of the row. The fact that only one or a few of the needles is entering its first core at any time means that the operator can concentrate on initially inserting only one or a few of the needle tips at a time.

In the course of stringing, a large number of wires are simultaneously being pulled through large numbers of cores. This could create a large amount of friction that would require large wire tensions, and in any case the friction could harm the wires or cores. The problem can become especially severe in the case of small cores and especially during a second or further stringing operation with wires already entered through the cores. In order to minimize friction, a lubricant is sprayed on the core matrix 10 prior to stringing the wires through the cores. A fine spray of water or similar fluid compatible with the product can be utilized to coat the cores with a film of fluid that acts as a lubricant. It has been found that a lubricant spray significantly decreases the friction of wires moving through the cores.

Figure 11:
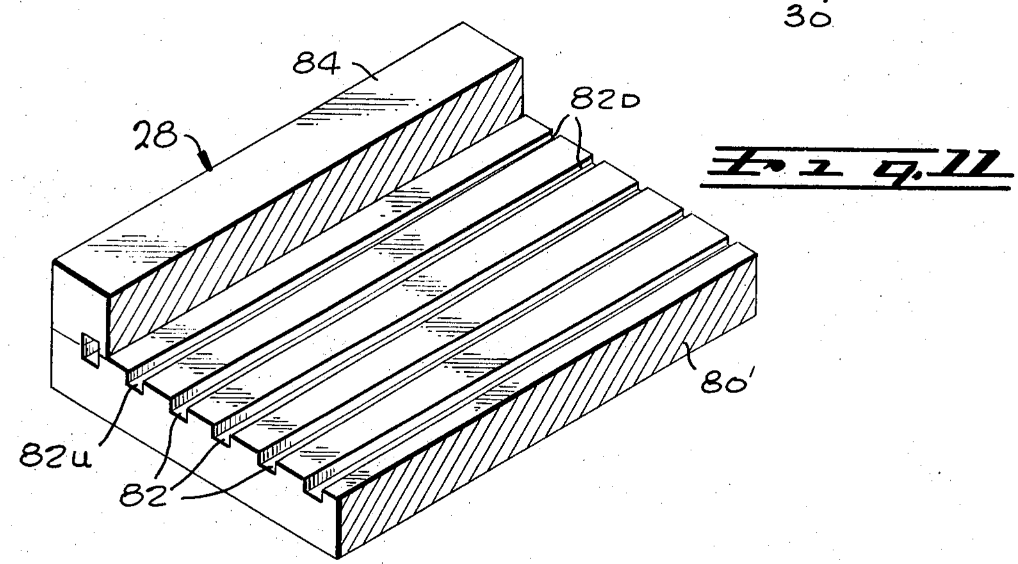
FIG. 11 is a perspective view of a portion of the guide of the apparatus of FIG. 3.

FIG. 11 illustrates a portion of the entrance guide 28 which directs the needles into the holes of the cores. The guide includes a lower guide part 80' with numerous passageways 82 formed in its upper surface, and an upper cover plate 84 which can be clamped over the lower part to close off the top of the passageways. Each of the passageways is tapered in width and depth along its length so that an up-path end 82U is larger than the down-path 82D. The larger up-path ends 82U facilitate the insertion of the needles into the passageways, while the smaller down-path ends 82D more closely determine the needle positions to more accurately guide them into the holes of the cores. A similar construction can be employed for the exit guide 30 which receives the needles after they have passed through the matrix, the larger ends of the passageways being useful to help capture the tips of the needles as they emerge from the matrix 10.

After the wires have been strung in one direction through a matrix of magnetic cores, difficulty may be experienced in projecting a second set of wires through the cores, because the first wires may tend to block the holes of the cores. It is also important from an electrical functional viewpoint that a consistent wire lay is maintained or that the intersecting wires do not basketweave. When the needles are being projected during the second stringing they may hit the first wires and have to deflect them out of the way. This can damage the wires by puncturing the insulation or causing excessive drag which can scrape off the wire insulation. Another embodiment of the invention, illustrated in FIG. 12, includes a matrix holding vise 90 with an upper surface 92 which is curved about an imaginary line 94 which extends parallel to the path of the needles 44. The vise includes a pair of rollers 96, 98 on either side of the matrix 10. The matrix 10 has already been strung with a first set of wires 22 which project from either side of the matrix. Each of the rollers 96,98 is held over the matrix by a pair of arms 100 which are biased by springs or clamps (not shown) which urge the rollers down against the wires 22. When the matrix is installed on the vise 90 with its wires 22 lying under the rollers 96, 98, the rollers are turned to pull the ends of the wires so that the wires 22 are maintained in a taut condition. The roller is made of a material that allows it slip on already taut wires so they do not stretch or break. As a result the wires 22 achieve the position shown in FIG. 13, wherein they lie at the bottom of the holes 18 of the cores 16. The rest of the areas of the holes 18 are then free to receive the needles 44, and if the needles are inserted at the proper height, they will not hit the wires 22 and will have a minimum of drag on the wires. Furthermore, the newly strung wires will all lie on top of all the previous wires, and therefore an uncontrolled basketweave configuration is avoided.

Figures 12, 13, 14:
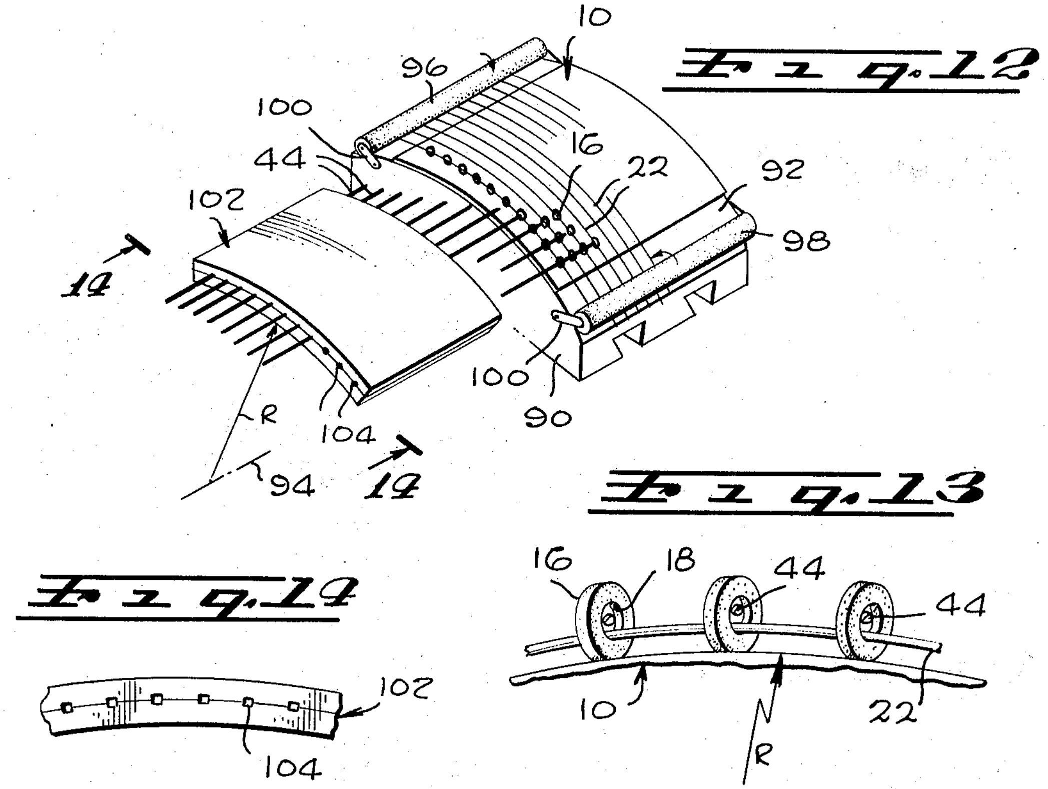
FIG. 12 is a partial perspective view of another embodiment of the invention, which is especially useful in stringing a set of wires through a core matrix that has already been strung with a first set of wires.
FIG. 13 is a partial perspective view of the matrix of FIG. 12, shown during the initial projection of needles through the core matrix.
FIG. 14 is a view taken on the line 14—14 of FIG. 12.

The curved vise 90 with the rollers 96, 98 thereon is useful in holding a matrix for a second or further stringing even if the second stringing is carried out by individual hand projection of needles. However, it can also be used in the multiple stringing method described earlier provided suitable modifications are made. As shown in FIG. 12, an entrance guide 102 is provided with passageways 104 that are arranged along a curve so that the needles are guided to move into the columns of cores. The passageways 104 are arranged along an imaginary surface which is curved about the same line 94 as is the upper surface 92 of the vise. Of course, it is not necessary that the matrix and guide passageways be curved about a single axis, but it is desirable that there be only a simple curvature rather than a compound curvature, so that each column of cores through which the needles must project are located along a line. The same needle-wire-tape assembly shown in FIG. 5 can be utilized in the second stringing using the apparatus of FIG. 12. The arrangement of the needle tips 44T substantially along a line angled from a lateral line 80 is especially useful in second stringing, inasmuch as the needles then successively push down the previous wires 22 if any portions are not lying at the bottom of the core holes. The fact that the first wires are held to the bottom of the core holes not only facilitates stringing, but also provides a more uniform product because all of the second wires will lie over the first wires instead of threading over and under them in an unpredictable manner.

The core stringing of the invention has been carried out for matrixes of small cores. Cores of an outer diameter of 0.020 inch and hole diameter of 0.014 inch have been strung with insulated wires of 0.0032 outside diameter whose front ends were butt welded to needles of 0.004 inch diameter. Tape which included a polyester strip of about 0.003 inch thickness with pressure sensitive adhesive thereon was utilized to substantially eliminate residue on the wires. Stringing has been accomplished using 128 parallel wires on a tape. It may be noted that the cores on a substrate may be arranged in "quads" or groups of cores that are separated from other groups of cores on the substrate, and the tape may be devoid of needles at the spaces corresponding to the spacing between the quads. Where the needles project through a first quad and then must pass through a space before entering the cores of a second quad on the substrate, an additional small guide may be positioned between the quads on a substrate to make sure that the needles properly enter the second quad.

Althrough particular embodiments of the invention have been described and illustrated herein, it is recognized that modifications and variations may readily occur to those skilled in the art and consequently it is intended that the claims be interpreted to cover such modifications and equivalents.

What is claimed is:

1. Apparatus for stringing magnetic cores comprising:

a strip of flexible material;

a plurality of elongated needles releasably held to said strip, said needles extending parallel to each other along the length of said strip and laterally spaced from one another along the width of the strip, each of said needles having front and rear end portions;

a plurality of parallel wires, each having a front end attached to the rear portion of one of said needles;

means for holding a matrix of magnetic cores; and means for advancing said strip with said needles thereon along a first path towards said matrix of cores, and then advancing only said tape along a second path angled from said first path so that said needles can separate from the strip as they approach said matrix of cores and pass through them.

2. The apparatus described in claim 1 wherein:

said plurality of needles are arranged so that extreme front ends of most of them are spaced at different distances from an imaginary transverse line extending perpendicular to the length of the strip.

3. In core stringing apparatus for projecting a multiplicity of wires through the holes of a multiplicity of rows of magnetic cores that are held in a matrix, the improvement comprising:

a strip of tape with adhesive means thereon;

a multiplicity of elongated needles disposed on said tape and held by said adhesive means thereof, said needles extending parallel to one another along the length of said tape and uniformly spaced from one another in a direction along the width of the tape, and said needles having forward and rearward ends; and a multiplicity of insulated electrical wires having front ends joined to the rearward ends of said needles and extending behind said needles, said wires disposed on said tape and held by said adhesive thereof, and said wires extending substantially parallel and uniformly spaced from one another on said tape.

4. The improvement described in claim 3 including:

matrix holding means for holding said matrix of cores;

a member having a first surface aligned with said rows of cores on said holding means so that needles moving on said tape along said first surface and continuing in a straight line therefrom can pass through said cores, and said member having an edge portion at an end of said first surface; and means for pulling said tape so it moves along said first surface and around said edge.

5. The improvement described in claim 4 wherein:

said means for pulling said tape includes a rotatably mounted roller spaced from the path of needles moving along said first surface and engaged with said tape, whereby said roller can be turned to pull said tape.

6. The improvement described in claim 3 including:

holding means for holding a matrix of said cores;

first means at a first end of said holding means for advancing said tape in a first direction towards said holding means and then in a second direction angled from said first direction, to advance said needles towards said holding means and to separate said tape from said needles before they reach said holding means; and second means at a second end of said holding means opposite said first means, for applying a strip of tape to said needles after they have passed across said holding means, whereby to provide a strip of tape with said needles thereon for passage through cores.

7. The improvement described in claim 6 including: first and second guides respectively disposed at said first and second ends of said holding means between said first and second means, each of said guides having a plurality of elongated passageways for guiding said needles through cores, the passageways of said first and second guides being aligned with each other.

8. The improvement described in claim 3 including: means for holding a matrix of cores that are arranged in a plurality of parallel rows so that the matrix is curved substantially about a predetermined axis extending parallel to the lengths of said rows;

a guide with a plurality of elongated passageways arranged along a curve so that said passageways are aligned with said rows; and means on a side of said guide opposite said means for holding a matrix, for advancing said tape so that said needles pass towards said guide.

9. A method for stringing a matrix of magnetic cores using a plurality of needles that are attached to a plurality of wires so that they form a plurality of needle and wire assemblies comprising:

mounting said plurality of needle and wire assemblies parallel to one another along a flexible member;

pulling said flexible member while separating it from said needles to simultaneously advance said needles towards and through said cores; and pulling said needles after they emerge from said cores to pull said wires through said cores.

10. The method described in claim 9 wherein:

said step of pulling said flexible member includes passing it around a separation member to alter the direction of movement of said flexible member without altering the direction of movement of said needles; and including passing said needles through multiple passages of a guide located between said separation member and matrix, to resist needle deflection by reason of pulling by the direction-altered flexible member.

11. The method described in claim 10 including:

removing the flexible member from the forward and middle portions of said wires at a time when the rear ends of said needles lie behind said separation member, so that said wires are not subjected to deflection by the flexible member as it changes direction in movement over said separating member.

12. The method described in claim 9 including:

again laying a flexible member on said plurality of needles beginning at a time after their forward ends pass through said matrix but before their rearward ends pass through, to provide another mounted group of needle and wire assemblies.

13. The method described in claim 9 including:

applying a lubricant to said matrix of cores prior to advancing said needles completely through said cores.

14. The method described in claim 9 wherein:

said matrix of cores includes a plurality of rows of cores, and wherein each of a plurality of first wires extends through a plurality of cores lying in a row, and including;

holding said matrix in a curve with the cores of each of said plurality of rows arranged substantially along an imaginary line, and with said imaginary lines substantially parallel to each other; and guiding said needles so they move along said imaginary lines as they approach said cores.

15. A method for stringing a second set of wires in a second predetermined direction through a matrix of magnetic cores which have already been strung with a first set of wires that extend in a first direction angled from said second direction comprising:

holding said matrix so it is curved substantially about an axis parallel to said second direction while maintaining said first wires in tension, to urge said first wires toward predetermined locations in the cores; and projecting said second set of wires through said cores along said second direction.

16. The method described in claim 15 wherein:

said step of maintaining said first wires in tension includes pressing a pair of members against regions of said first wires on opposite sides of said matrix and moving the portions of said members which contact said wires away from said matrix.

* * * * *